(12) United States Patent
Hughes

(10) Patent No.: US 8,133,399 B2
(45) Date of Patent: Mar. 13, 2012

(54) THIOSULFATE REMOVAL METHODS AND SYSTEMS

(75) Inventor: Mark A. Hughes, Bartlesville, OK (US)

(73) Assignee: ConocoPhillips Company, Houston, TX (US)

(*) Notice: Subject to any disclaimer, the term of this patent is extended or adjusted under 35 U.S.C. 154(b) by 0 days.

(21) Appl. No.: 13/111,523

(22) Filed: May 19, 2011

(65) Prior Publication Data

US 2011/0215056 A1   Sep. 8, 2011

Related U.S. Application Data

(60) Provisional application No. 61/352,669, filed on Jun. 8, 2010.

(51) Int. Cl.
*C02F 1/72* (2006.01)
*C01B 17/62* (2006.01)

(52) U.S. Cl. ..................... 210/758; 423/519.2

(58) Field of Classification Search .................. 210/721, 210/749, 758, 763, 765, 506, 902; 423/220, 423/221, 226, 228, 232, 514, 519, 519.2; 502/215–223
See application file for complete search history.

(56) References Cited

U.S. PATENT DOCUMENTS

| | | | |
|---|---|---|---|
| 4,360,508 A * | 11/1982 | Farrington et al. | ........... 423/226 |
| 5,215,728 A | 6/1993 | McManus | |
| 5,380,442 A | 1/1995 | Yan | |
| 6,180,080 B1 | 1/2001 | Proulx et al. | |
| 6,558,646 B1 | 5/2003 | Harmon et al. | |
| 2003/0072707 A1 * | 4/2003 | Ray et al. | ........... 423/514 |

OTHER PUBLICATIONS

Reach, M. "Meta-synthesis: The Hard Soft [Lewis] Acid Base Principle" (2003) (obtained Aug. 2011 from www2.chemistry.msu.edu/courses/CEM812/Hard_SoftAcid_Base.pdf).*
Yan et al., "Removal of Thiosulfate/Sulfate from Spent Stretford Solution" Environmental Science and Technology vol. 14, No. 6, (1980), pp. 732-735.*

\* cited by examiner

*Primary Examiner* — Joseph Drodge
*Assistant Examiner* — Lucas Stelling
(74) *Attorney, Agent, or Firm* — ConocoPhillips Company

(57) ABSTRACT

Described herein is a cost effective method and system for removal of thiosulfate from a solution in-line with a process system. The method and system include passing the solution in contact with an open-structured substrate impregnated with a Group 16 element, which results in removal of thiosulfate from the solution and conversion of the thiosulfate to at least sulfite.

8 Claims, 2 Drawing Sheets

THIOSULFATE REMOVAL METHODS AND SYSTEMS

CROSS-REFERENCE TO RELATED APPLICATION

This application is a non-provisional application which claims benefit under 35 USC §119(e) to U.S. Provisional Application Ser. No. 61/352,669 filed Jun. 8, 2010, entitled "THIOSULFATE REMOVAL METHODS AND SYSTEMS," which is incorporated herein in its entirety.

BACKGROUND

The described application relates generally to methods and systems involving removal of sulfur species, including removal of sulfur species from a process stream.

Sulfur species are removed from process streams to reduce pollution and prevent release into the atmosphere. Sulfur removal often occurs by hydrodesulphurization. Hydrodesulphurization generally leads to a reaction product that includes hydrogen sulfide ($H_2S$). $H_2S$ is a gas that is flammable, explosive and highly odorous with an odor threshold as low as 5 ppb, and has been designated as injurious to health over a working lifetime exposure level of 5 ppmv (threshold limit value). $H_2S$ therefore undergoes additional conversion to more elemental components, which may occur using a number of processes, such as incorporating carriers and/or dyestuff intermediates into the hydrodesulphurization solution. While sulfur is recovered in the solution with such processes, there is also an undesirable accumulation of certain sulfur species, such as thiosulfate and thiosulfite. An example is the Stretford Process, a continuous wash that removes hydrogen sulfide and oxidizes it in an alkaline solution. The solution used is considered regenerative and may be recycled through oxidization with air. The primary component recovered in the Stretford Process is elemental sulfur. Unfortunately, thiosulfate as well as sulfate is also irreversibly recovered. The converted thiosulfate present in the Stretford solution reduces the rate of regeneration and, thus, at least about 20-30% of the process solution must be continuously purged and cannot be recycled. In some processes, thiosulfate accumulation requires the entire system to shut down in order to chemically destroy or dispose of the thiosulfate. Disposal of a spent process solution containing thiosulfate along with recovery of chemicals contained in a purged process solution remain costly.

SUMMARY

Disclosed herein are methods and systems for processing solutions containing thiosulfate.

Generally, described herein is a thiosulfate removal system comprising treatment material consisting essentially of open structured substrate impregnated with a Group 16 element, wherein the treatment material is in-line with a process system; and a process solution containing thiosulfate, wherein the solution passes through the treatment material and thiosulfate is removed from the solution while in line with the process system. The solution may be adjusted to a predetermined temperature and pH. The predetermined temperature is generally at about or less than about 70 degrees Centigrade. The predetermined pH is generally at or less than 4. The thiosulfate is converted to at least a sulfite after passing through the treatment material. The Group 16 element may be one of sulfur, selenium or tellurium. The process system may be a sour water system. The treatment material may be packed in a column. The solution may pass through the packed column more than once. The solution exiting the packed column may be further adjusted to a pH greater than about 4 and then pass through the packed column at least once more. The impregnated substrate may be in the form of one of particle, pellet or powder. The open structured substrate may be activated carbon. The flux of the solution passing through the packed column is generally at or less than about 10 gallons per minute/$ft^2$.

Described herein is also a method for removing thiosulfate from a solution containing thiosulfate, the method comprising the steps of flowing the solution in contact with treatment material, wherein after the contact with the treatment material, the solution has a substantially reduced thiosulfate concentration and the thiosulfate has been partially or fully converted to products including sulfite; and wherein the solution is in-line with a process system. The method may further include adjusting the solution to a predetermined temperature and pH. The predetermined temperature is generally at about or less than about 70 degrees Centigrade. The predetermined pH is generally at or less than 4. The treatment material may be an impregnated substrate packed in a column through which the solution flows. The treatment material may be open structured substrate impregnated with a Group 16 element through which the solution flows. The Group 16 element may be one of sulfur, selenium or tellurium. The solution may be in a sour water system. The method may further comprise raising the pH of the solution to greater than about 4 and flowing the solution through the treatment material again to remove additional toxins in solution selected from the group consisting of soft Lewis acid and borderline Lewis acid. The step of flowing is generally at a hydraulic flux of about or less than about 10 gallons per minute/$ft^2$.

Those skilled in the art will further appreciate the above-noted features and advantages of the invention together with other important aspects thereof upon reading the detailed description that follows and in conjunction with the drawings.

BRIEF DESCRIPTION OF THE DRAWINGS

For more complete understanding of the features and advantages of the inventions described herein, reference is now made to a description of the invention along with accompanying figure, wherein.

DESCRIPTION

Figure 1:
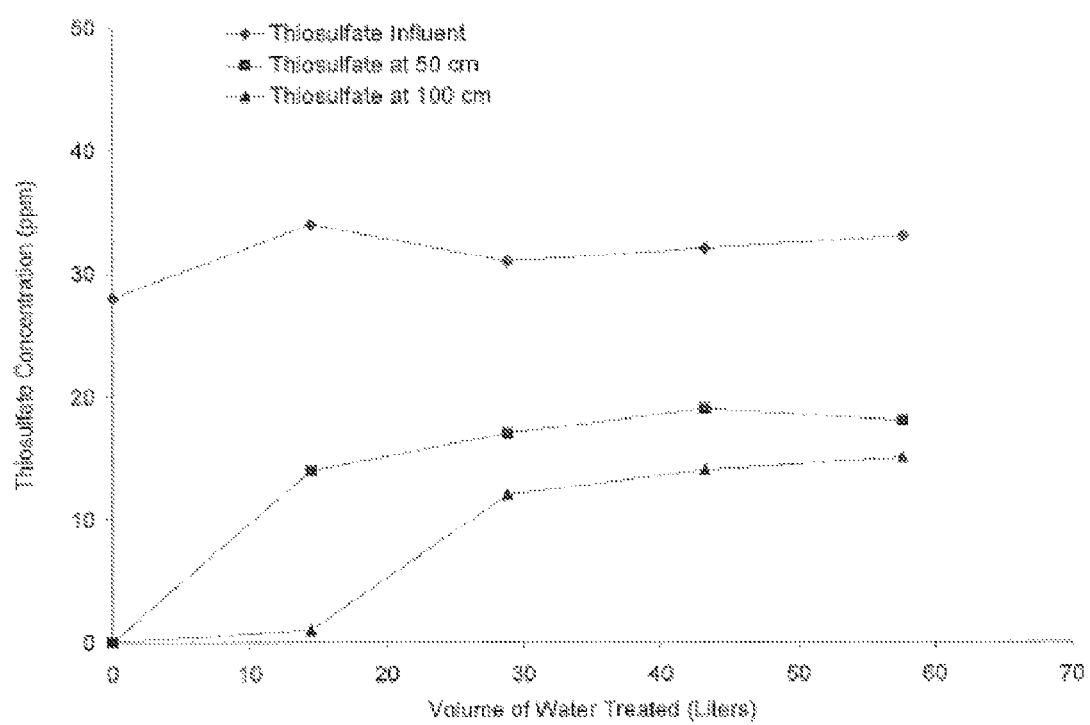
FIG. 1 depicts the amount of thiosulfate in an influent and effluent stream as described herein.

Although making and using various embodiments are discussed in detail below, it should be appreciated that the description provides many inventive concepts that may be embodied in a wide variety of contexts. Any specific embodiments discussed herein are merely illustrative of ways to make and use the invention, and do not limit the scope of the invention.

References will now be made to the drawing. The drawing figures are not necessarily to scale and certain features may be shown exaggerated in scale or in somewhat generalized or schematic form in the interest of clarity and conciseness.

Thiosulfate is an oxyanion of sulfur. It is a reducing agent that causes rapid corrosion of metals and has been restricted to certain levels in various process systems. It may be produced or recovered from reactions of sulfur with sodium sulfite in boiling solutions. It may be produced or recovered from reactions with $SO_2$ gas and sulfide or carbonate liquors, such as in paper making processes, and may be recovered from oxidation of process solutions containing sulfur dye, hydrogen sulfide, sodium sulfide and the like.

Described herein is a system and method for treating and/or removing undesirable thiosulfate from a solution. Generally, the solution is a process solution. Processes may include but are not limited to those involved in refining of nonferrous metals, electroplating of common metals, coal conversion processes, manufacturing of high explosives, manufacture of iron and steel, pulping and paper-making, recovery of metals, processing of ores to one or more metals, fertilizer manufacturing, biogas production, and other manufacturing processes. The system and method provided herein include a modification of the process solution containing thiosulfate followed by passing the modified solution through treatment material.

Modification of the thiosulfate-laden solution generally includes adjusting the pH of the solution and adjusting the temperature of the solution. In one or more embodiments, the thiosulfate-laden solution may already have an adjusted pH. In additional embodiments, the thiosulfate-laden solution may already have an adjusted temperature.

Considering a thiosulfate-laden solution in which the pH and temperature need adjusting, the invention described herein includes adjusting the pH of the solution to at about or below pH 4. In some embodiments, the pH is adjusted to at or below 3.0. In some embodiments, the pH is adjusted to at or below 2.5. The pH adjustment may include using an inorganic or organic acid. In one form, sulfuric acid is used to adjust the pH of the solution containing thiosulfate. Examples of inorganic acids include but are not limited to chloric and chlorous acids, nitric and nitrous acids, sulfuric and sulfurous acids, bromic and bromous acids, phosphoric and phosphorous acid and variations thereof. Examples of organic acids include but are not limited to carboxylic acid, haloic acid, and hydroxy acid. Further examples include lactic acid, acetic acid, formic acid, citric acid, oxalic acid and uric acid. The acid may be in a solid, liquid or gaseous form, depending on the temperature. In one form, the pH is adjusted prior to adjusting the temperature of the solution. The alternative may also occur, and may be dependent on the thiosulfate-laden solution and/or the process and system that is already in place.

The temperature adjustment may include heating, such as via a heating element, and/or adding a hot mixture, such as the pH adjuster described above to the thiosulfate-laden solution. The temperature is generally adjusted to greater than ambient temperature. In one or more forms, the temperature may already be high and little or no adjustment may be necessary. In further embodiments, the temperature may have to be reduced by cooling, relying on a means for cooling or by adding a cooling solution to the thiosulfate-laden solution. Generally, the temperature of the thiosulfate-laden solution is adjusted to a temperature that is greater than about 30 degrees Centigrade and adjusted to a temperature that is below the boiling point of the thiosulfate-laden solution, such as below about 99 degrees Centigrade or below about 95 degrees Centigrade or below about 90 degrees Centigrade or below about 85 degrees Centigrade. In some embodiments, the temperature is adjusted to greater than 50 degrees Centigrade. In some embodiments, the temperature is adjusted to greater than 60 degrees Centigrade. In some embodiments, the temperature is adjusted to between about 65 degrees and about 80 degrees Centigrade.

In some embodiments, modification of the solution may include pretreatment to remove organic compounds and/or solids in the solution. The organic compounds or solids can foul the treatment material in subsequent processing to remove the thiosulfate as described herein. Therefore, positioning a solids filter or an organic sorbent bed ahead of the treatment material may extend useful life of the treatment material.

The thiosulfate-laden solution whether modified as described herein or unmodified is then contacted with the treatment material. Generally, the treatment material includes an impregnated substrate. In one form, the substrate is a form of carbon. In another form, the substrate is silica, alumina or an inorganic material useful as a molecular sieve. The source of carbon may be any of a number of typical carbon materials, including coal, shells, sawdust, lignite, as examples. The inorganic material may include substrates derived from alumina, silica, clay, mullite, aluminum titinate, titania, zirconia, ceria particles, and the like. Molecular sieves may also include an aluminosilicate, silica gel, porous glass, zeolite or synthetic compound having an open structure through which small molecules (e.g., water) can diffuse through.

The substrate may be formed to a desired and predetermined size. Suitable particle sizes for process solutions described herein include 10 mm or less or may be 4 mm or less or may be 1 mm or less. The shaping and sizing to obtain a desired size may occur via molding or crushing methods, as examples, and include those methods known to one of skill in the relevant art. In some forms, the shaped and sized substrate may be in the form of a pellet, granule or powder, depending on their shape, size and/or other characteristics. For use, the substrate (shaped and sized) has an open structure through which small molecules (and water) can diffuse through. The open structure may include an increased surface area with or without creating additional external or internal surfaces. Generally, the shaped and sized substrate has an open structure and large surface area. In one or more embodiments, the shaped and sized substrate must be made to have an open structure and large surface area. In one or more embodiments, an open structure surface is achieved by activation of the substrate, which may occur via gas activation (e.g., carbonization when using a carbon source) or chemical activation. In one form, the shaped and sized substrate is prepared for activation by initially heating to produce a transition material. For carbon, the transition material may be in the form of coke or char. In some instances, the starting material may be a transition material and, thus, the initial heating may not be necessary. An example is when the starting material is petroleum coke. The transition material is then activated to produce an open structure and larger surface area, such as by having small pores and/or internal surfaces. Activation may be achieved under elevated temperatures in a gaseous environment (e.g., gas activation or carbonization) or by use of electrical resistance heating. In another form, the shaped and sized substrate is prepared for activation by being mixed with a chemical in solution, such as an acid or strong base, to produce a transition material. The transition material is then heated at an elevated temperature (e.g., carbonization) to produce an open structure and larger surface area, such as by having pores and/or internal surfaces.

The open structured substrate is impregnated with a material that includes a Group 16 element, such as sulfur, selenium and/or tellurium. Impregnation may occur by any suitable means for impregnating an open structured substrate. Examples include but are not limited to methods known to those skilled in the relevant art, such as thermal deposition, Claus condensation, adsoption and others. The impregnated substrate may also be a recycled or by-product of another process that provides a Group 16 element (e.g., sulfur, selenium and/or tellurium and allotropes thereof) on the open structured substrate. Thus, the invention is not limited to the means by which the Group 16 element is provided on the substrate surface. In addition, the invention is not limited to the form of the Group 16 element, such that the Group 16 element may be in an elemental form or may be provided as a salt or an oxide, as examples. Because the thiosulfate concentration in many process waters is low, the amount of Group 16 element on the surface of the open structured substrate may also be low. In some forms, the amount of impregnated material may be a fraction of the total mass of the open structured substrate. The amount of impregnated material may range from an amount of 0.1% to 99.9% of the total mass of the substrate. Typically, an amount of impregnated material that is greater than 1% to about 30% is suitable and may be achieved by methods known to those of skill in the relevant art. In some embodiments, the amount of impregnated material is about 5% to 28% of the total mass of the substrate. In additional embodiments, the amount of impregnated material is about 10% to 25%. In further embodiments, the amount of impregnated material is about 10% to about 20% of the total mass of the substrate or is about 15% to about 20% of the total mass of the substrate.

In some embodiments, the open structured substrate is pretreated before it is impregnated. Pretreatment may provide further sites for complexation with the material to be impregnated. Pretreatment generally includes an agent capable of associating with the substrate and complexing with the impregnating material. Examples of agents that may be used for pretreatment of the substrate include but are not limited to amines, and alkaline bases and halogen salts of an alkaline base. For example, the open structured substrate, such as an organic substrate, may be pretreated with potassium iodide and/or with potassium hydroxide. In another example, the substrate may be initially pretreated with triethylenediamine.

The open structured substrate after impregnation may be added to the thiosulfate-laden solution directly. In such circumstances, the impregnated substrate is generally allowed to settle and is then collected via a mesh or screen with opening smaller than the size of the substrate. Direct treatment may occur more than once to reduce the absolute amount of thiosulfate. In addition or as an alternative, the thiosulfate-laden solution may be passed in contact with an open structured substrate after impregnation. When passing the solution through the impregnated substrate, the impregnated substrate is often in the form of a bed. This type of treatment may also include a recycling of the solution through the bed more than once. The amount of impregnated substrate added to the thiosulfate-laden solution as well as the size of the bed generally depend on the concentration of the influent solution and the volume of the solution to be treated. Advantageously, a thiosulfate-laden solution once treated as described herein (e.g., after direct addition or after passing through a bed) has a reduced thiosulfate concentration that is low enough to allow continued use of the solution. For example, a Stretford solution containing thiosulfate is capable of being reused in the Stretford process after it is treated as described herein.

When a bed of the impregnated substrate is used, the bed may be in the form of a column containing therein the impregnated substrate. The shape and size of the substrate bed is generally governed by the hydraulic flux of the solution. Common flux values in industrial process systems are about 1 gallon per minute (GPM)/ft$^2$ to less than about 10 GPM/ft$^2$. Higher rates may also be used. The material selected for the column is generally cooperative with the solution composition and temperature. The column material must be able to operate and maintain structural integrity when in use. Often, columns for industrial processing systems are made of high-temperature materials, such as metals or metal alloys, preferably those that are noncorrosive. Examples include steel, stainless steel, nickel alloy, nickel-copper alloy and the like. Suitable representative materials are Monel® (a nickel alloy, trademark of Inco Alloys International, Inc, Huntington, W. Va.) and Hastelloy® (a metal alloy, trademark of Union Carbide and Carbon Corporation, New York, N.Y.). Columns may also be made of a polymer material, such as plastic, or glass.

In some embodiments, the thiosulfate-laden solution may be a continuous stream. In additional embodiments, some or all of the solution may be re-routed to pass through the same impregnated substrate more than once. In addition or as an alternative, the thiosulfate-laden solution may pass through more than one bed of the impregnated substrate.

In some forms, the thiosulfate-laden solution may be adjusted prior to passing through the impregnated substrate. In other forms, the thiosulfate-laden solution may flow through the impregnated substrate at a flow rate consistent with the process system flow rate. The hydraulic flux may be adjusted to between about 0.1 to about 1000 GPM/ft$^2$. In one or more embodiments the hydraulic flux is maintained and less than about 100 GPM/ft$^2$. The hydraulic flux may be less than about 50 GPM/ft$^2$ or is less than about 10 GPM/ft$^2$ or is in a range from between about 0.1 to about 10 GPM/ft$^2$ or is between about 1 to about 5 GPM/ft$^2$ or is between about 2 to about 5 GPM/ft$^2$ or is between about 1 to about 4 GPM/ft$^2$.

While not limited to any particular theory, the thiosulfate is converted to sulfite with elemental sulfur from conversion of the thiosulfate believed to be absorbed by the treatment material, upon contact of the solution with the treatment material. The sulfite produced may further react with oxygen and form sulfate. The sulfite product thus may represent an intermediary product even though the sulfate is a final product generated.

In one example, a solution containing 35 ppm of thiosulfate was passed through a sample bed containing an impregnated substrate. The substrate was activated carbon in the form of pellets 4 mm in size and impregnated with elemental sulfur at a high temperature. The amount of sulfur was about 12% of the total mass of the substrate. The sample bed had a diameter of 1.02 cm and a length of 100 cm. The solution going into the bed (influent) had a pH of 2.5 and a temperature of 68 degrees Centigrade. The solution was fed through the bed and the hydraulic flux of the influent solution was 3 GPM/ft$^2$. Effluent was measured at 50 cm and at 100 cm from the start of the bed.

The composition of the influent introduced into the bed is provided in the table. The temperature of the influent was measured as 68 degrees Centigrade.

| Composition of Solution | |
|---|---|
| | ppm |
| Cations | |
| Sodium | 15 |
| Calcium | 1.5 |
| Ammonium | 293 |
| Anions | |
| Chloride | 10 |
| Sulfide | 560 |
| Sulfite | 0.6 |
| Thiosulfate | 35 |
| Thiocyanate | 37 |
| Acetate | 128 |

-continued

| Composition of Solution | |
|---|---|
| | ppm |
| Proprionate | 89 |
| Butyrate | 36 |
| Other | |
| Total organic compounds (organic acids and phenolics) | 444 |
| Phenolics | 329 |
| Se total | 1500 ppb |

The influent thiosulfate concentration passing into the sample bed as a function of time is shown in FIG. 1 (see diamonds), which is consistent with the amount of thiosulfate in the composition as shown in the above table. The effluent thiosulfate concentration as a function of time elapsed is also shown in FIG. 1, wherein the squares depict the effluent thiosulfate amount measured at a distance of 50 cm and the triangles depict the effluent thiosulfate amount measured at a distance of 100 cm (e.g., full length of the bed). FIG. 1 shows that thiosulfate removal continued for the entire duration.

In the short sample time shown in FIG. 1, about 50% of the thiosulfate was removed by the method and system described herein. In addition, increasing the bed length is shown to have an effect on improving the amount of thiosulfate removed from solution. Lengthening the bed generally increases the amount of thiosulfate removed from the solution as well as increases the duration that a solution may pass through the bed while continuing to remove thiosulfate. As shown in the figure, a very small bed length removed a substantial amount of thiosulfate from the solution. Moving to an industrial scale, in which a column bed may be 14 feet in length and greater and 7 to 12 feet in diameter, it is clear that such a method and system is operational for many hundreds of liters and more, assuming the influent solution contained about the same amount of thiosulfate and flowed at a generally standard rate, such as about 200 to 300 gallons per minute.

Figure 2:
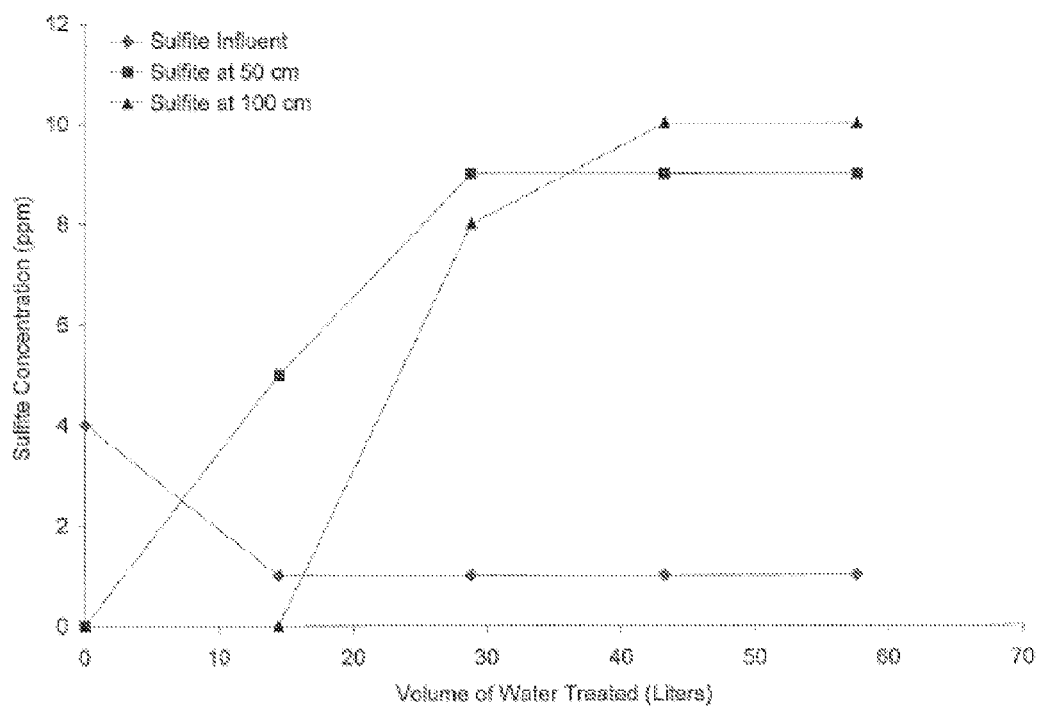
FIG. 2 depicts sulfite concentration in the influent and effluent stream as described herein.

With the system and method described herein, thiosulfate present in a solution is believed, in one form, to chemically convert in the effluent. FIG. 2 shows that sulfite is present in the effluent within a very short time, and the amount of sulfite in the effluent is substantially greater than the amount in the influent. In addition, the length of the bed was found to influence the amount of thiosulfate recovered over time. Adjusting the bed length is one way to remove more thiosulfate from the solution because the amount of thiosulfate that is converted is, in part, dependent on the length of the packed bed. Thus, increasing the bed length increases the amount of thiosulfate removed and converted. In addition, temperature also influences thiosulfate removal. With an increase in solution temperature, a shorter bed length may be required for most solutions that flow at a generally standard rate, such as less than 500 gallons per minute.

Relying on a system and method described herein should reduce overall operation cost and materials given that the method and system described herein may be placed in-line with an existing process stream and the effluent may be easily re-routed and or re-used without requiring shut down of the existing system.

In one or more embodiments, advantageously additional deleterious components, such as mercury, arsenic, cadmium, as examples, may similarly be removed from the process system because the impregnated open structured substrate may act as an adsorbant for such compounds. For mercury removal, however, a pH adjustment may be made, such that the process solution is less acidic, generally at a pH greater than 4. The pH adjustment may readily be made by adding to the downstream effluent sodium hydroxide or potassium hydroxide or an alkali solution, as examples.

In one or more embodiments, the system and method described herein provide an improved system and method for removing thiosulfate and other toxins, such as mercury, arsenic, and cadmium, from a solution.

Although the foregoing description of embodiments have shown, described and pointed out certain novel features of the invention, it will be understood that various omissions, substitutions, and changes in the form of the detail as illustrated as well as the uses thereof, may be made by those skilled in the art, without departing from the scope of the invention. Particularly, it will be appreciated that the one or more embodiments may manifest itself in other shapes and configurations as appropriate for the end use of the article made thereby.

What is claimed is:

1. A method comprising:
   flowing a solution containing thiosulfate in contact with treatment material, wherein the treatment material is an open structured substrate impregnated with a Group 16 element, wherein after the contact with the treatment material, the solution has a reduced thiosulfate concentration and the thiosulfate is partially or fully converted to products including sulfite.

2. The method of claim 1, wherein the Group 16 element is one of sulfur, selenium or tellurium.

3. The method of claim 1, wherein temperature of the solution is at about or less than about 70 degrees Centigrade.

4. The method of claim 1, wherein pH of the solution is at or less than 4.

5. The method of claim 4, further comprising raising the pH of the solution to greater than about 4 and flowing the solution through the treatment material again to remove additional toxins in solution selected from the group consisting of soft Lewis acid and borderline Lewis acid.

6. The method of claim 1, wherein the treatment material is packed in a column.

7. The method of claim 1, wherein the solution is in a sour water system.

8. The method of claim 1, wherein the flowing is at a hydraulic flux of about or less than about 10 gallons per minute/$ft^2$.

* * * * *